(12) United States Patent
Broadhead

(10) Patent No.: US 6,259,054 B1
(45) Date of Patent: Jul. 10, 2001

(54) METHOD OF FITTING A VALVE SEATING RING AND AN APPARATUS THEREFOR

(75) Inventor: Philip Broadhead, Kirby Muxloe (GB)

(73) Assignee: Unova U.K. Limited, Aylesbury (GB)

( * ) Notice: Subject to any disclaimer, the term of this patent is extended or adjusted under 35 U.S.C. 154(b) by 0 days.

(21) Appl. No.: 09/308,209

(22) PCT Filed: Oct. 3, 1997

(86) PCT No.: PCT/GB97/02719

§ 371 Date: May 13, 1999

§ 102(e) Date: May 13, 1999

(87) PCT Pub. No.: WO98/28523

PCT Pub. Date: Jul. 2, 1998

(30) Foreign Application Priority Data

Dec. 21, 1996 (GB) .................................................. 9626639
Aug. 7, 1997 (GB) .................................................. 9716625

(51) Int. Cl.[7] .................................................. B23K 11/00
(52) U.S. Cl. .................................... 219/117.1; 29/888.44
(58) Field of Search ......................... 219/117.1, 78.01, 219/78.02; 29/888.06, 888.44

(56) References Cited

U.S. PATENT DOCUMENTS 5,742,020 * 4/1998 Adachi et al. ..................... 219/78.01
5,768,779 * 6/1998 Adachi ............................. 219/117.1

FOREIGN PATENT DOCUMENTS

| 0 723 069 | 7/1996 | (EP) . |
| 0 727 565 | 8/1996 | (EP) . |
| 0 735 248 | 10/1996 | (EP) . |
| 0 740 054 | 10/1996 | (EP) . |
| 0 751 284 | 1/1997 | (EP) . |

* cited by examiner

Primary Examiner—Geoffrey S. Evans
(74) Attorney, Agent, or Firm—Lee, Mann, Smith, McWilliams, Sweeney & Ohlson

(57) ABSTRACT

A welding machine for weld bonding a valve seating ring in an annular recess of a cylinder head (20) includes an electrode tool (14) on which the ring is located and an overhead support (18, 40, 44, 46) for mounting the cylinder head above the tool. In use the electrode tool is moved upwards into the recess while a welding current is passed across the cylinder head and the electrode tool, so that the ring is weld bonded into the recess, without process spatter entering the cylinder head. There can be two separate electrode tools which operate simultaneously on respective recesses although the weld current may be applied sequentially.

19 Claims, 6 Drawing Sheets

METHOD OF FITTING A VALVE SEATING RING AND AN APPARATUS THEREFOR

FIELD OF INVENTION

This invention concerns the forming of valve seatings in metal castings forming parts of internal combustion engines, most commonly cylinder heads of such engines.

BACKGROUND TO THE INVENTION

Conventional techniques for forming valve seats in cylinder heads involve cryogenically freezing sintered alloy iron annular seating rings, force fitting the rings into recesses in the cylinder head, and then machining. Recently it has been proposed to reduce the iron sector of the seating rings and it has now been proposed to electrically weld or otherwise bond the seating rings into position using resistance welding techniques, typically DC current derived from a single or more preferably multiphase AC supply.

Problems have arisen in designing apparatus for achieving this proposal, not least of which involve the handling of the relatively small metal rings which are to constitute the seatings, and the positioning of these reliably for welding.

An ancillary problem arises from the inevitable process spatter which, if not removed from the cylinder head, would cause problems when the resulting engine was run.

In EP-A-0751284 there is disclosed a method of securing a valve seat member to a cylinder head recess, in which the cylinder head is placed on a press machine with the recess facing upwards, the member is pressed down against the recess, and the member is metallurgically bonded to the recess by applying a voltage thereacross via upper and lower electrodes. However, this prior disclosure does not obviate either of the above mentioned problems.

SUMMARY OF THE INVENTION

According to one aspect of the present invention there is provided a method of fitting a valve seating ring in a annular recess in an engine component, such as a cylinder head comprises the steps of:

a) supporting the engine component above a workstation so that the recess which is to receive a valve seating ring faces in a generally downward direction;

b) positioning the ring at the upper end of a tool which forms part of the workstation and is adapted to be moved in an upward direction towards a component supported thereabove;

c) moving the tool so upwards so that the upper end enters the recess and positions the seating ring accurately therein;

d) exerting an upward force so as to press the ring uniformly against at least one region of the recess into which it is to be fixed;

e) causing an electric current to flow across the junction between the ring and the component so as to locally heat and cause a plastic deformation of the component material around the ring, to weld-bond the ring to the component;

f) terminating the flow of current to allow the site to cool; and g) removing the tool and leaving the seating ring bonded to the component, to form the valve seating.

It is an advantage of the present method that any metal spatter which can occur during the heating and bonding process will tend to fall under gravity away from the component and can be collected and conveyed away from the workstation, if desired. This is achieved in accordance with the invention by having the reverse arrangement to that disclosed in EP-A-0751284.

Preferably the component can be indexed so as to present different ones of a plurality of recesses therein in alignment with said tool so as to allow each of the recesses to be fitted with a valve seating ring in the manner aforesaid.

According to another aspect of the invention there is provided apparatus for fitting a valve seating ring in an annular recess in an engine component, comprising component support means positioned adjacent and above a workstation, a tool in the workstation, drive means for moving the tool in an upward and downward direction relative to the component support means, means for aligning the tool axis and the support means so that the up and down movement of the tool is in alignment with a given region of the component support, means for locating onto the upper end of the tool a valve seating ring, control means for controlling the drive means to cause the tool to move upwards and position the ring located thereon in a recess in the component carried by the support means, electrical connections between a supply of electric current and the component and the tool so as to cause an electric current to flow from one to the other when contact is made between the ring and the component, means for exerting a force on the tool or the support means or both to push the tool and the support means towards each other so that the ring on the tool is pressed into contact with said recess in order to resistance weld the seating ring in place, said control means also causing the drive means to withdraw the tool in a downward direction clear of the ring when weld-bonded to the component, permitting relative lateral movement between the component support and the tool to allow the later to be aligned with another region of the component support means or to allow a component carried by the support means to be moved away and replaced by another component for fitting a ring therein.

Since considerable heat is generated during the weld-bonding process, preferably both the tool and the component holding device are fluid cooled, typically using water or glycol solution.

Furthermore, since there will be local temperature rise within the component around each weld bond site at least during and immediately after a ring has been welded into place, the sequence in which rings are fitted to the component is chosen, so that successive rings are located at well spaced apart regions of the component, allowing the heat generated during the previous welding step to dissipate, and prevent an integration of heating in any one region.

The invention also lies in an engine component when fitted with one or more valve seating rings in accordance with the aforementioned method.

The apparatus is of particular use in forming valve-seats in the underside of an aluminium engine cylinder head.

In order to accommodate misalignment between the axis of the tool and the axis of a annular recess into which a valve seating ring is to be fitted, the tool may be formed in two parts, an upper and a lower part, and the upper part is adapted to receive a valve seating ring thereon and is mounted on the lower part so as to be movable relative thereto so as to allow the valve seating ring to fit uniformly and accurately into a recess into which it is introduced.

In a modern internal combustion engine, valve seats are typically arranged in pairs relative to each cylinder and there may be four valves (and corresponding number of valve seats) per cylinder, arranged in two pairs. In some engine cylinder heads the axes of the narrow diameter bores associated with one pair of valve seats, extend in a divergent manner through the cylinder head relative to the axes of the bores of the other pair. The two valve seats of each pair (and therefore the recesses into which the valve seating rings are to be fitted), are in close proximity in the cylinder head, but the valve seating rings of each pair cannot be fitted and bonded simultaneously or even in quick succession due to the cumulative heating which would occur. However it is possible to consider fitting a seating ring to one of the bores in one pair associated with a first cylinder, and one of the pair of bores associated with another cylinder which is remote from the first cylinder, in quick succession.

To achieve this there is provided tool means adapted to support at the upper end thereof a pair of valve seating rings for movement into engagement with and fitting into each of two spaced apart recesses in the cylinder head in the manner described as aforesaid, each of the two valve seating rings being presented to the tooling means in the workstation from a supply of said valve seating rings, and the tooling means being movable to present and insert the valve seating rings located thereon simultaneously into the two recesses, and electric current is caused to flow through the tooling means to weld-bond the valve seating rings in place.

Whilst it is possible to envisage simultaneous welding of two well spaced apart sites, more preferably first one and then the other ring is welded into place in quick succession.

Preferably separate electrical paths are provided through the tooling means to the two separate tools carrying the two rings, and a common return path is provided through the cylinder head. Two separate electric current supplies may be provided, each of which is adapted separately to supply welding current to each of the two separate welding sites so that if the electrical resistance associated with one of the welding sites is different from that of the other, the magnitude of the electric current, and time for the current to flow, can be controlled accordingly so as to produce a similar weld at each interface. Alternatively a single current supply may be provided, switchable to provide current to first one and then the other weld site.

By using separate electrical paths, electric current will not be diverted from a higher resistance site through a lower resistance site thereby producing an overweld and excessive spatter in one site and a relative poor weld (or no weld at all) in the other, if simultaneous welding is attempted.

BRIEF DESCRIPTION OF THE DRAWINGS

The invention will now be described, by way of example, with reference to the accompanying drawings in which.

DETAILED DESCRIPTION OF THE DRAWINGS

Figure 1:
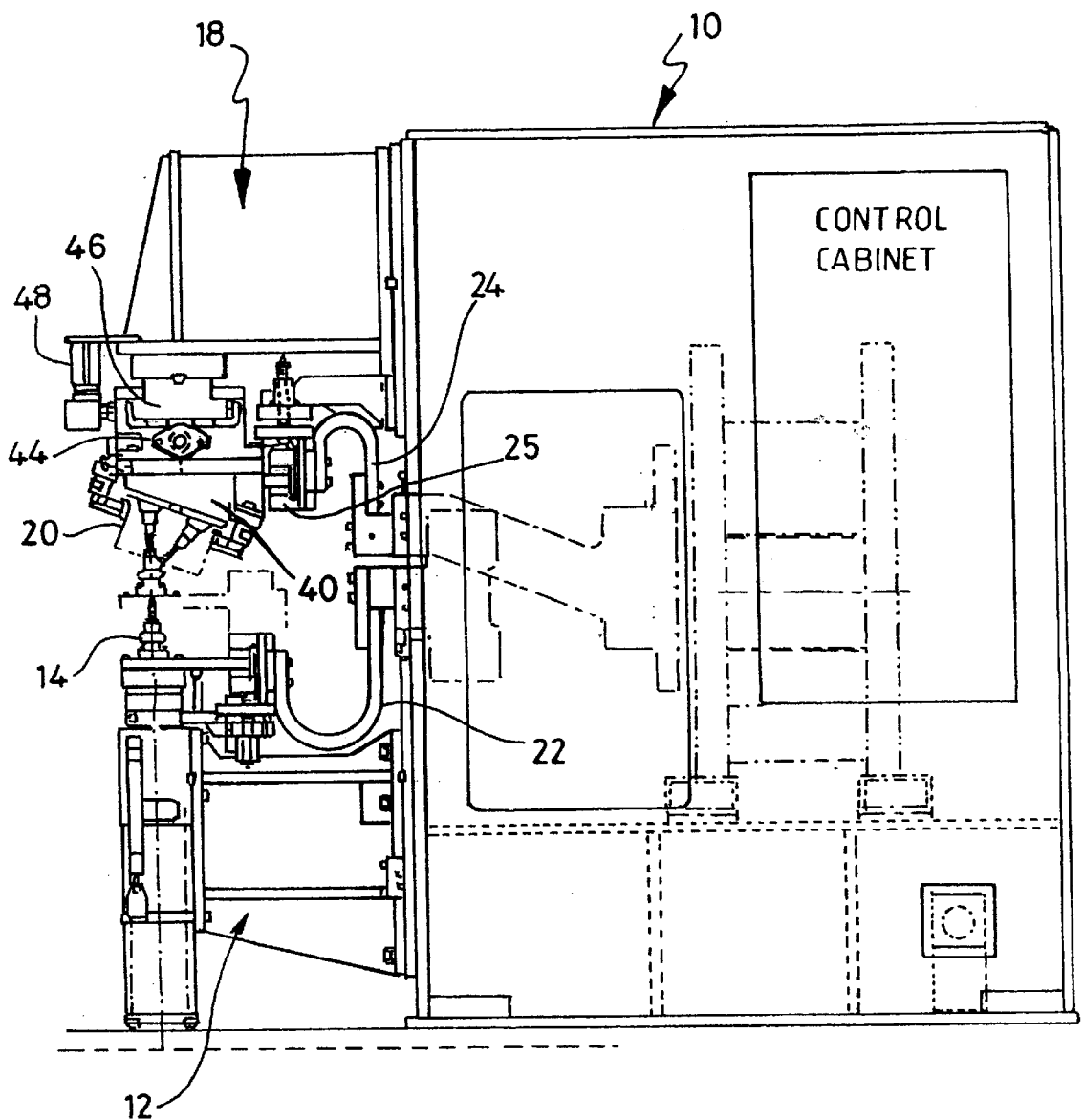
FIG. 1 is a side view of a machine in accordance with the invention for weld-bonding valve seating rings to a combustion engine cylinder head.
Figure 2:
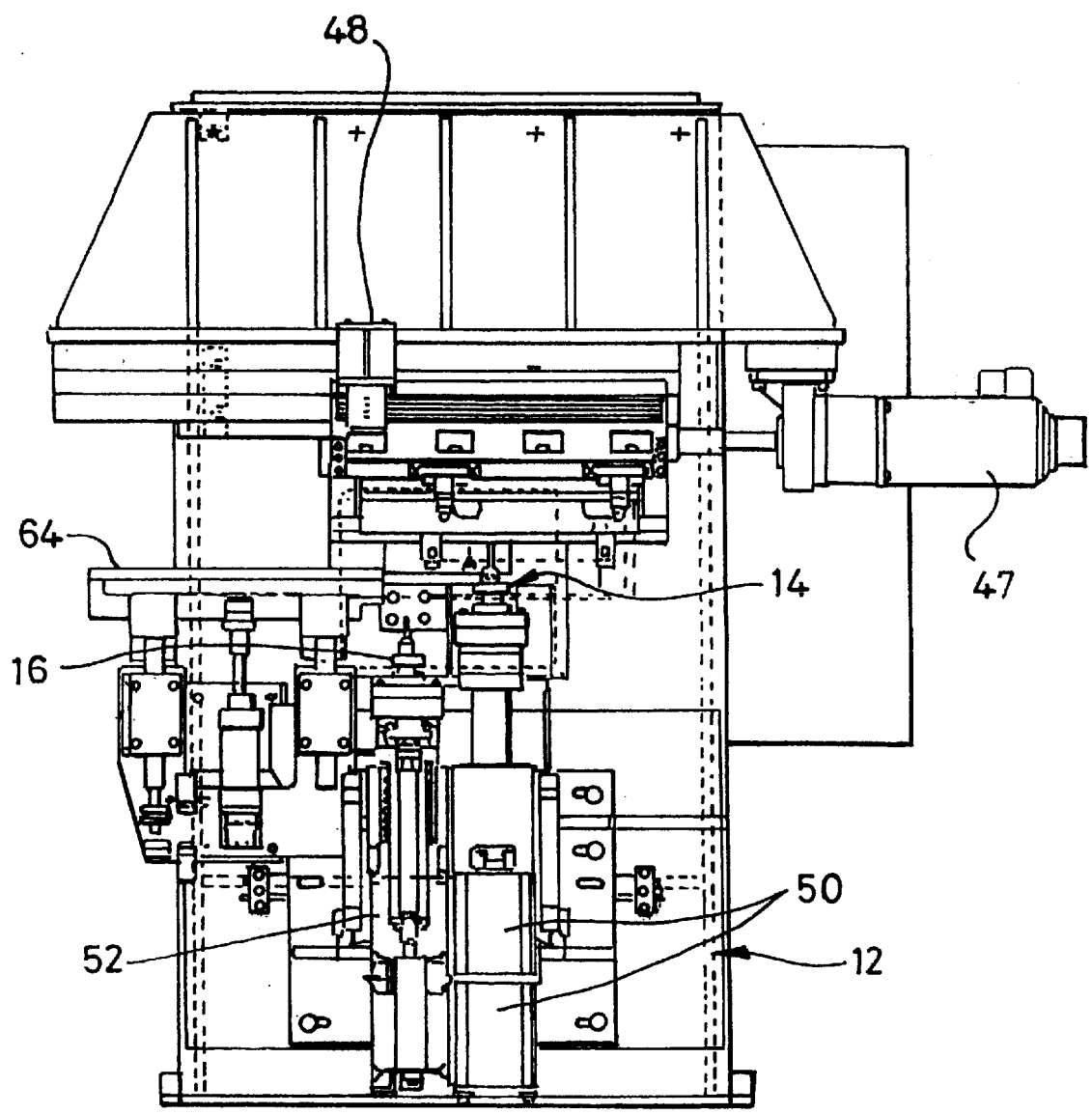
FIG. 2 is a front view of the machine of FIG. 1.

Referring first to FIGS. 1 and 2, the machine shown comprises essentially a main frame, shown generally by the reference numeral 10, to one face of which is bolted a table or knee 12 on which are mounted two vertically moveable electrode tools 14, 16. Above the knee the frame includes an overhead support 18 for supporting an aluminium cylinder head 20 of an internal combustion engine. Electric power is fed to the electrode tools 14, 16 by a pair of flexible electric cables 22, the rear one of which is not visible. Similarly a flexible electric cable 24 is connected to a lower part of the cylinder head support via an electric clamping unit 25, so that in use a welding circuit is completed when the tools 14, 16 engage the cylinder head 20.

Figure 4:
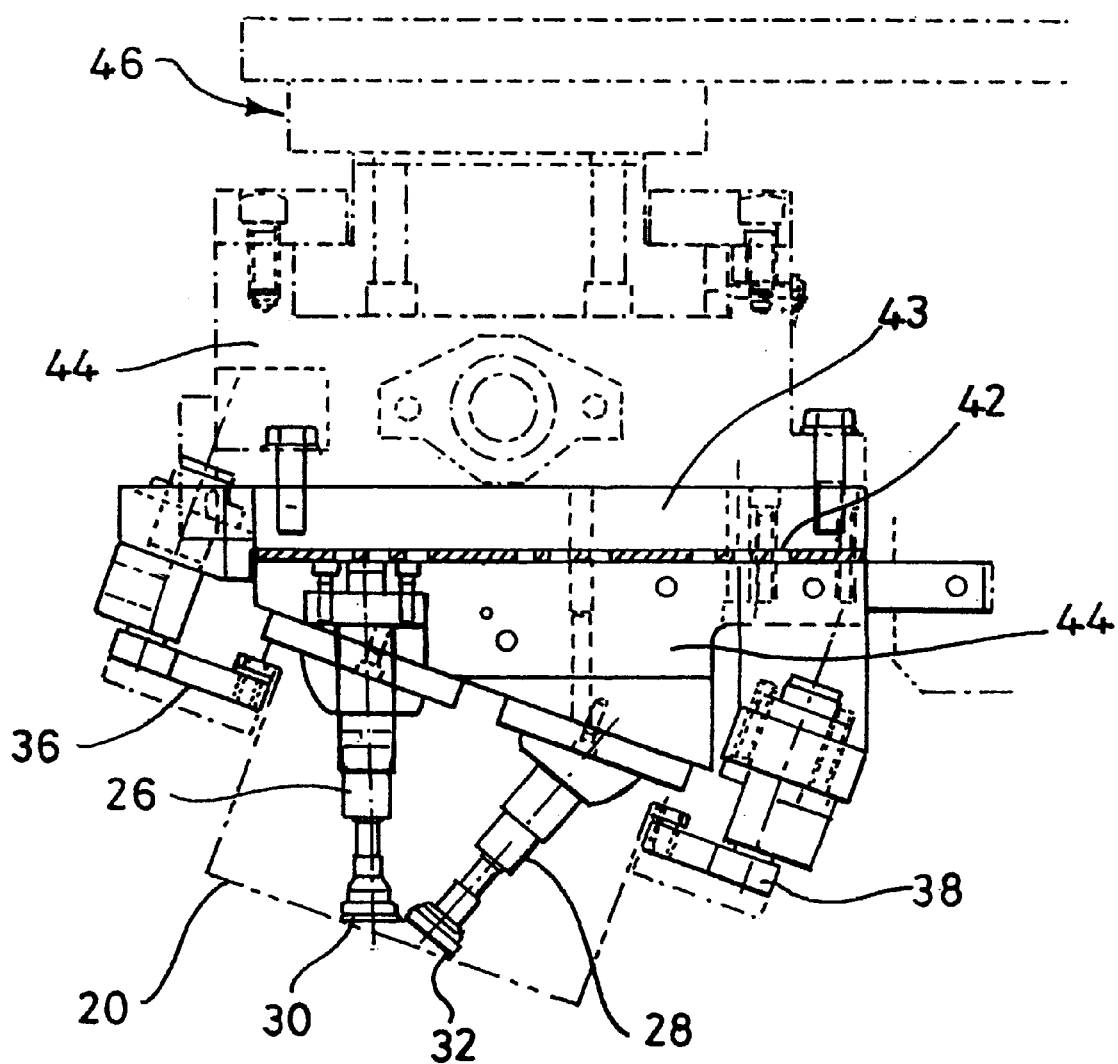
FIG. 4 is an enlarged side view showing the support for a cylinder head.
Figure 5:
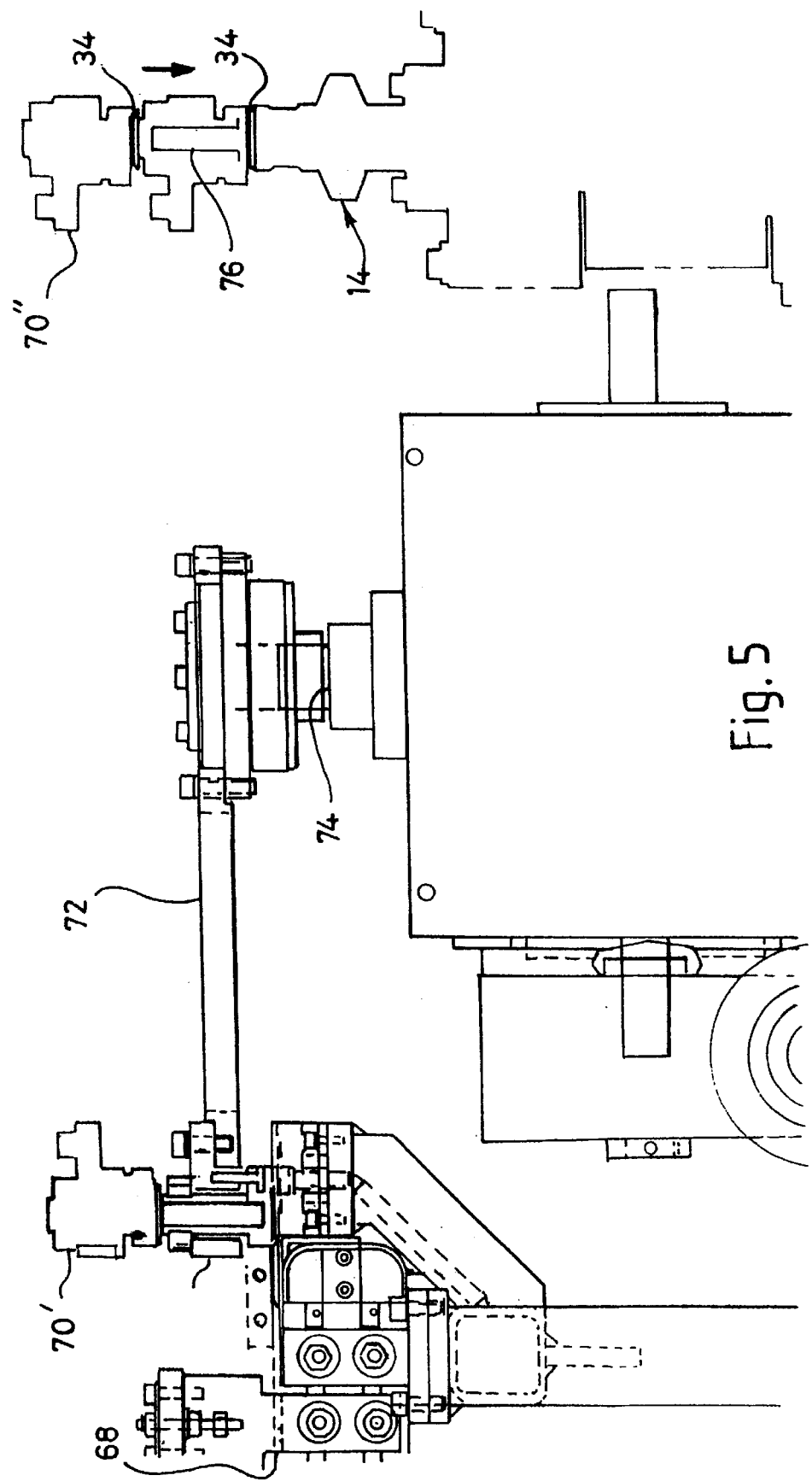
FIG. 5 is a side view of a mechanism for supplying valve seating rings to the machine.

Referring now also to FIG. 4, the cylinder head 20 (shown chain-dotted) is formed with two shaped valve bores 26, 28 which are inclined at an angle to one another so that their lower ends meet at what will become the domed head of an engine cylinder. At the lower ends of the bores 26, 28 (which in use will house the engine valve stems) are formed annular recesses 30, 32 respectively, into each of which is to be weld-bonded a valve seating ring made of a copper coated sintered iron alloy. The ring 34 is shown in FIG. 5 held in position on tool 14 prior to being weld-bonded.

The cylinder head 20 is held by clamps 36, 38 against an inclined face of a wedged-shape mounting 40, made of copper, such that the axis of the valve bore 26 is vertical. The mounting 40 is connected via an electrically insulated layer 42 and adapter plate 43 to a member 44, which in turn is mounted for horizontal sliding movement from a fixed slide unit 46 (shown chain-dotted in FIG. 4) forming part of the overhead support 18. The electric cable 24 is connected to the mounting 40 such that the layer 42 electrically insulates the upper part of the support 18 from the electric power supply.

Horizontal movement of the member 44 (and hence of the cylinder head 20) along the slide unit 46 is effected by an AC servo-positioning motor and decoder 47 (FIG. 2). The position of the member 44 is determined by a position detector 48 which sends pulses to the decoder, thereby enabling the latter to count pulses from a "zero home" position and so identify the position of the slide unit.

Figure 3:
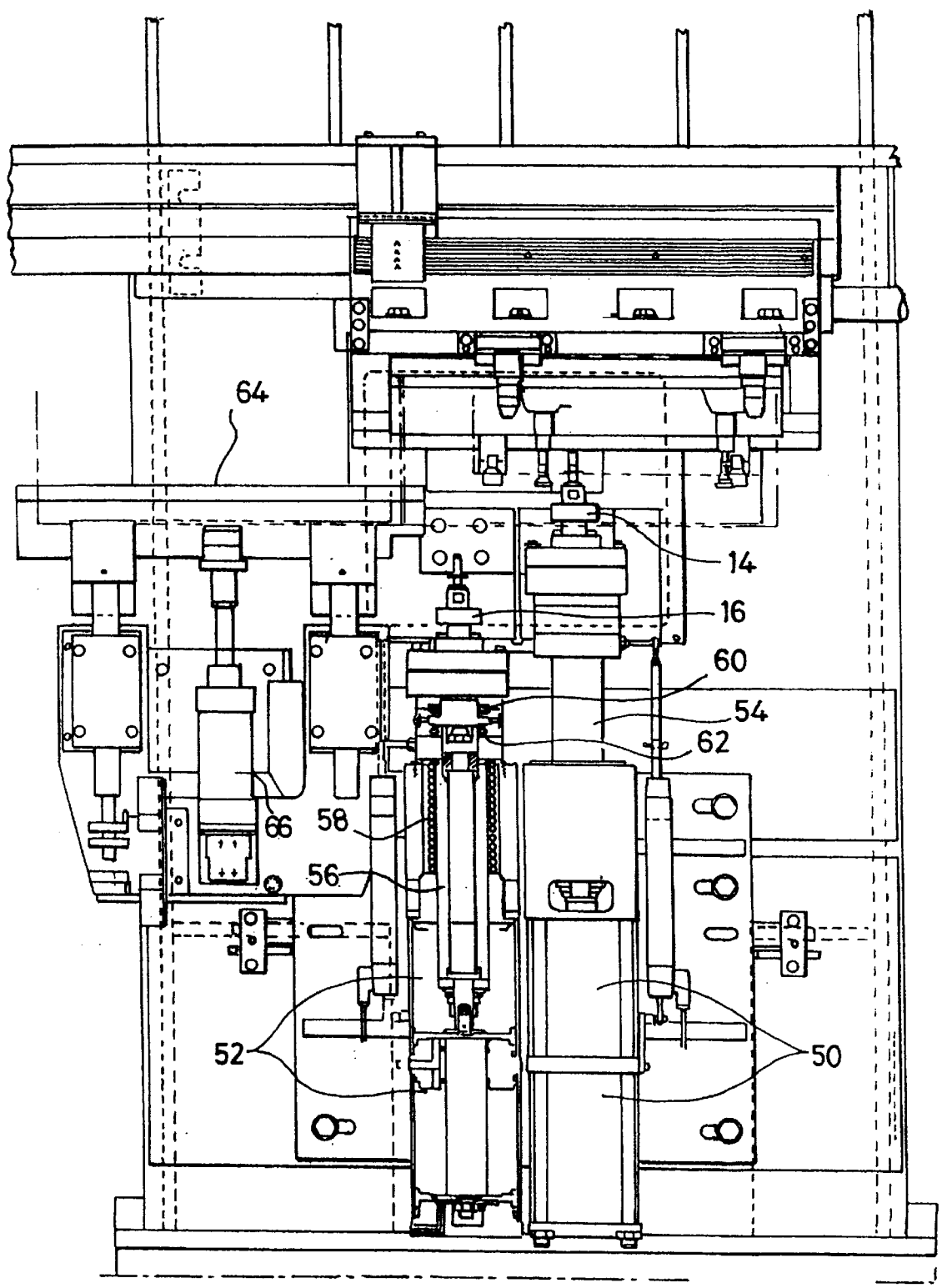
FIG. 3 is an enlarged view taken from FIG. 2 of a device for aligning an electrode tool with a recess in a cylinder head.

Referring now particularly to FIG. 3, each of the tools 14, 16 is independently movable in a vertical direction, typically by a distance of approximately 155 mm, by means of thrust rods 54, 56 actuated by two-stage pneumatic cylinders 50, 52 respectively. The left-hand cylinder 52 and rod 56 are shown in section, and the retracted rod 56 can be seen mounted for vertical sliding movement in a linear ball bearing 58. The tool 16 is connected to the rod 56 by a coupling comprising upper and lower thrust bearings 60, 62 respectively, which allow the tool 16 a limited degree of radial movement in order to accommodate any initial misalignment between the tool and the valve bore (such as bore 26) in the cylinder head 20. The tool 14 is likewise coupled by alignable thrust bearings, similar to the bearings 60, 62.

FIGS. 2 and 3 also show a loading unit, comprising a table 64 which is vertically moveable by means of a pneumatic ram 66, enabling a cylinder head 20 to be raised to the required position for it to be clamped to the mounting 40 when located thereabove, and likewise to be lowered for removal from the machine.

Referring now to FIG. 5, there is shown a feed unit for loading seating rings 34 onto a single tool, such as the tool 14. A conveyor mechanism 68 feeds rings in a single line to a pick-up position. From here a suction head 70 is fixed to an arm 72 locates and grips a ring. The arm 72 is pivotally mounted above a shaft 74 which is also vertically moveable by a cam (not shown), typically by a distance of 60 mm.

Thus the head 70 is lifted to the position shown at 70', and is then moved by the arm 72 through an angle of about 180°. In this position of the head, shown at 70", the centre of the ring is aligned with the axis of the tool 14. The head is then lowered and suction released, so that the ring is positioned on the tool above a cylindrical nose or pilot portion 76 of the tool.

For use with the two tools 14, 16, the arm 72 carries a second suction head (not shown), similar to the head 70, and spaced apart by the same distance as the spacing between the tools 14 and 16, enabling the unit to deposit a ring onto each of the tools in a single operation.

Figure 6:
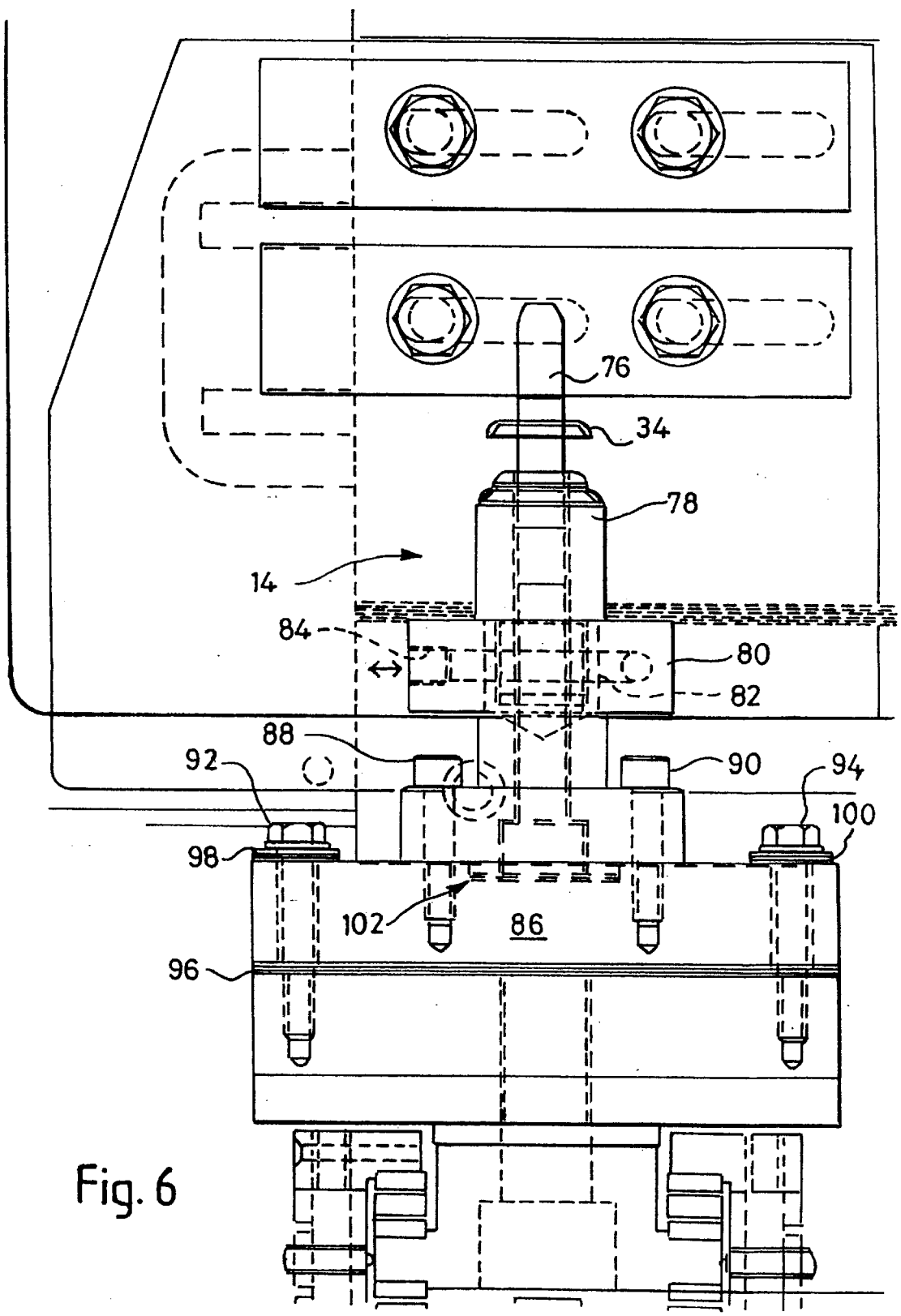
FIG. 6 is a detailed view of the electrode tool and the means for cooling thereof.

FIG. 6 is an enlarged detail view of the electrode tool 14 showing a removable locator member 78 adapted to support the ring 34. Since different diameter rings may be required for a cylinder block, i.e. for the exhaust and inlet valves, the locator member 78 can be removed and replaced by a similar member of different diameter.

Beneath the member 78 the tool 14 incorporates a cooling block 80 having a passage 82 extending around the centre of the tool which is generally of U-shape as viewed from above. Threaded ports 84 at the ends of the passage 82 enable flexible hoses (not shown) to be connected to the passage so as to allow coolant fluid to be fed thereto.

The tool 14 is connected via an intermediate block 86 (see also FIG. 3) to the top of the respective two-stage cylinder 50 or 52 by upper bolts 88, 90 and lower bolts 92, 94. In order to prevent electrical current from passing down below the block 86, an insulating layer 96 is interposed and insulating washers 98, 100 are fitted beneath the heads of the bolts 92 and 94 respectively. Additionally, an insulating layer 102 is fitted between the bottom face of the tool 14 and the intermediate member 86 to act as a double insulation.

The operation of the machine will now be described:

After a cylinder head 20 has been loaded by the loading unit and clamped to the mounting 40, a valve seating ring 34 is deposited by the feed unit onto each electrode tool. The motor 47 then moves the slidable member 44, and hence the cylinder head, into the correct position so that the tool 14 is in alignment with the bore 26, and the tool 16 is in alignment with a similar bore in the head 20 disposed behind the bore 26, as viewed in FIG. 1. Electric power is next connected to the cable 24 and at first to the cable 22 for the tool 14. Coolant fluid is fed to the passages 82 of both tools 14 and 16 which are then raised by the cylinders 50, 52 to bring the rings thereon into contact with the respective annular recesses 30 in the cylinder head. During this movement the nose 76 of each tool (which may additionally be made of electrically nonconductive material) enters the respective bore 26, 28, any minor misalignment being taken care of by the thrust bearings 60, 62.

Initially a lower force is applied by the cylinder 50, before welding of the ring 34 to the recess 30 commences, and then a higher force is applied at the same time as, or just after, welding has been initiated.

After the welding current has been disconnected, so that the ring 34 is weld-bonded to the recess 30, the cylinder 50 is lowered and the current is now applied to the other cable 22 for the tool 16, so that the ring 34 thereon is similarly weld-bonded to the respective recess 30. Any weld spatter produced during the welding process will fall downwards away from the cylinder head 20, and can be removed by known means (not shown).

In order further to cool the tools 14, 16 and the rings 34 now bonded to the cylinder head, an air knife (not shown) may blow cool air into that region. At the same time coolant is fed to internal passages (not shown) in the mounting 40 to reduce its temperature and that of the cylinder head clamped thereon.

The motor 47 is then actuated to move the cylinder head to the next location requiring seating rings to be welded thereon. When all the rings have been welded, in line with the bank of valve bores including bore 26, the cylinder head 20 is removed and reclamped to the mounting 40 with the other bank of bores including bore 28, which will now be vertically disposed. After the locator members 78 on the tools 14, 16 have been replaced by different diameter ones, appropriately sized seating rings are then welded in position in the recesses 72 of respective bores 28 in a similar manner as described above.

It will be apparent that the machine in accordance with the invention enables the small seating ring to be handled in a reliable manner, and at the same time prevents weld spatter from entering the cylinder head.

What is claimed is:

1. A method of fitting a valve seating ring (34) in an annular recess (30) in an engine component (20), comprising the steps of:
   a) supporting the engine component above a workstation so that the recess which is to receive a valve seating ring faces in a generally downward direction;
   b) positioning the ring at the upper end of a tool (14) which forms part of the workstation and is adapted to be moved in an upward direction towards the component supported thereabove;
   c) moving the tool upwards so that the upper end enters the recess and positions the seating ring accurately therein;
   d) exerting an upward force so as to press the ring uniformly against at least one region of the recess into which it is to be fixed;
   e) causing an electric current to flow across a junction between the ring and the component so as to locally heat and cause a plastic deformation of the component material around the ring, to weld-bond the ring to the component;
   f) terminating the flow of current to allow the site to cool; and
   g) removing the tool and leaving the seating ring bonded to the component, to form the valve seating.

2. A method according to claim 1 in which the component (20) is indexed so as to present different ones of a plurality of recesses (30) therein in alignment with said tool (14) so as to allow each of the recesses to be fitted with a valve seating ring.

3. A method according to claim 2 in which the tool (14) or the component support (18) is mounted so as to accommodate any misalignment, so as to enable the axis of the recess (30) in which the ring (34) is to be fitted to be aligned with the axis of movement of the tool.

4. Apparatus for fitting a valve seating ring (34) in an annular recess (30) in an engine component (20), comprising component support means (18) positioned adjacent and above a workstation, a tool (14) in the workstation, drive means (50) for moving the tool in an upward and downward direction relative to the component support means, means for aligning the tool axis and the support means so that the up and down movement of the tool is in alignment with a given region of the component support, means (78) for locating onto the upper end of the tool a valve seating ring, control means for controlling the drive means to cause the tool to move upwards and position the ring located thereon in a recess in the component carried by the support means, electrical connections (22) between a supply of electric current and the component and the tool so as to cause an electric current to flow from one to the other when contact is made between the ring and the component, means for exerting a force on the tool or the support means to push the tool and the support means towards each other so that the ring on the tool is pressed into contact with said recess in order to resistance weld the seating ring in place, said control means also causing the drive means to withdraw the tool in a downward direction clear of the ring when weld-bonded to the component, permitting relative lateral movement between the component support and the tool to allow the latter to be aligned with another region of the component support means or to allow a component carried by the support means to be moved away and replaced by another component for fitting a ring therein.

5. Apparatus according to claim 4 in which at least one of the tool (14) and the component holding device are fluid cooled.

6. Apparatus according to claim 4 and further comprising means for directing a jet of fluid towards the component after the bonding has occurred, to cool the ring and the component in the region of the weld-bond.

7. Apparatus according to claim 6 in which the jet of fluid is directed toward the component so that any material which has spattered from the welding-bonding zone is blown thereby away from the component.

8. Apparatus according to claim 4 in which the workstation has means for collecting and conveying away therefrom any spattered material.

9. Apparatus according to claim 4 in which the tool (14) is formed as an upper and a lower part, the upper part being adapted to receive a valve seating ring thereon and being mounted on the lower part so as to be readily movable relative thereto so as to allow the valve seating ring to fit uniformly and accurately into the recess.

10. Apparatus according to claim 4 in which at least two rings are to be weld-bonded to the component, further comprising tooling means adapted to support at the upper end thereof a pair of valve seating rings for movement into engagement with and fitting into each of two spaced apart recesses in the component, each of the two valve seating rings being presented to the tooling means in the workstation from a supply of said valve seating rings, and the tooling means being movable to present and insert the valve seating rings located thereon simultaneously into the two recesses, whereby electric current from said supply is caused to flow through the tooling means to weld-bond the pair of valve seating rings in place.

11. Apparatus according to claim 10 in which separate electrical paths are provided through the tooling means to the two separate tools carrying the two rings, and a common return path is provided through the cylinder head.

12. Apparatus according to claim 11 in which two separate electric current supplies are provided, each of which is adapted separately to supply welding current to each of the two separate welding sites so that if the electrical resistance associated with one of the welding sites is different from that of the other, the magnitude of the electric current, and time for the current to flow, can be controlled accordingly so as to produce a similar weld at each interface.

13. Apparatus according to claim 10 in which the tooling means comprises two spaced apart noses on which valve seating rings can be positioned, and the means for introducing relative movement between the tooling means and a supported inverted cylinder head causes appropriate movement of both of the noses into the respective spaced apart valve seat recesses, and means for exerting a compressive force first between the one valve seating ring and its recess in the cylinder head, to produce an appropriate thrust on each ring during the application of welding current.

14. Apparatus according to claim 13 in which a first lower force is applied just prior to the welding current application, and a second higher force is applied at the same time as, or just after the initiation of the welding current.

15. Apparatus according to claim 4 in which control means is provided for controlling the flow, magnitude and duration of the electric current so that whether a single or multiple welding process is employed, the appropriate current and duration of flow is available for each weld site, so that each of the valve seating rings is appropriately welded in position.

16. Apparatus according to claim 4 comprising composite tooling having a plurality of separate tooling elements adapted to present and insert a plurality of valve seating rings simultaneously into each of a corresponding plurality of recesses on the underside of an inverted cylinder head component supported thereabove, so that all of the said plurality of seating rings can be positioned and held in place ready to be weld-bonded in weld site recesses in the cylinder head during a sequence of weld-bond operations, with appropriate relative movement between each of the separate elements of the tooling means and the cylinder head so as to force each of the seatings into the cylinder head recesses into which they are to be secured, just before and during the application of welding current.

17. Apparatus according to claim 4 comprising conveying means for supplying valve seating rings to the workstation, ready to be received in the correct position on the upper end of the tool for conveyance into a recess in the underside of the component.

18. Apparatus according to claim 17 in which the conveying means includes an escapement or buffer store so that the presentation of the seating rings to the tool is controlled, and occurs as required.

19. Apparatus according to claim 17 in which the conveying means comprises an arm (72) rotatable about a vertical axis and carrying a vacuum suction device (70) at its end remote from the pivoting axis, for placement over and picking up of an upturned ring on a conveyor or other feed mechanism, allowing the ring to be lowered over and onto the tool.

* * * * *